(12) United States Patent
Yepremyan et al.

(10) Patent No.: US 8,306,943 B2
(45) Date of Patent: Nov. 6, 2012

(54) SEASONALITY-BASED RULES FOR DATA ANOMALY DETECTION

(75) Inventors: Lusine Yepremyan, Glendale, CA (US); Amrinder Arora, Centreville, VA (US); Christopher Kakovitch, Herndon, VA (US)

(73) Assignee: NTelx, Inc., Vienna, VA (US)

( * ) Notice: Subject to any disclaimer, the term of this patent is extended or adjusted under 35 U.S.C. 154(b) by 323 days.

(21) Appl. No.: 12/717,460

(22) Filed: Mar. 4, 2010

(65) Prior Publication Data

US 2011/0218836 A1    Sep. 8, 2011

(51) Int. Cl.
*G06F 15/00* (2006.01)
(52) U.S. Cl. .......... 706/62; 706/925; 702/181; 702/184; 702/185; 702/189; 702/23; 703/17; 703/22; 705/14.52
(58) Field of Classification Search .................. None
See application file for complete search history.

(56) References Cited

U.S. PATENT DOCUMENTS

| | | | | |
|---|---|---|---|---|
| 5,136,686 A * | 8/1992 | Koza | ............... | 706/13 |
| 5,659,593 A * | 8/1997 | Tzvieli | ............... | 379/13 |
| 5,841,946 A * | 11/1998 | Naito et al. | ............... | 706/62 |
| 6,169,981 B1 * | 1/2001 | Werbos | ............... | 706/23 |
| 6,233,493 B1 * | 5/2001 | Cherneff et al. | ............... | 700/95 |
| 6,594,528 B1 * | 7/2003 | Hirano | ............... | 700/9 |
| 6,625,569 B2 * | 9/2003 | James et al. | ............... | 702/183 |
| 6,738,811 B1 * | 5/2004 | Liang | ............... | 709/224 |
| 6,834,266 B2 * | 12/2004 | Kumar et al. | ............... | 705/7.29 |
| 6,882,940 B2 * | 4/2005 | Potts et al. | ............... | 702/23 |
| 6,910,017 B1 * | 6/2005 | Woo et al. | ............... | 705/7.29 |
| 7,092,929 B1 * | 8/2006 | Dvorak et al. | ............... | 705/28 |
| 7,197,474 B1 * | 3/2007 | Kitts | ............... | 705/7.31 |
| 7,251,589 B1 * | 7/2007 | Crowe et al. | ............... | 702/189 |
| 7,263,506 B2 * | 8/2007 | Lee et al. | ............... | 705/38 |
| 7,310,590 B1 * | 12/2007 | Bansal | ............... | 702/181 |
| 7,437,308 B2 * | 10/2008 | Kumar et al. | ............... | 705/7.33 |
| 7,523,047 B1 * | 4/2009 | Neal et al. | ............... | 705/7.35 |
| 7,526,446 B2 * | 4/2009 | Aguais et al. | ............... | 705/38 |
| 7,580,862 B1 * | 8/2009 | Montelo et al. | ............... | 705/26.1 |
| 7,610,214 B1 * | 10/2009 | Dwarakanath et al. | ............... | 705/7.31 |
| 2001/0014868 A1 * | 8/2001 | Herz et al. | ............... | 705/14 |
| 2002/0099597 A1 * | 7/2002 | Gamage et al. | ............... | 705/10 |
| 2002/0106709 A1 * | 8/2002 | Potts et al. | ............... | 435/14 |
| 2002/0123930 A1 * | 9/2002 | Boyd et al. | ............... | 705/14 |
| 2002/0133721 A1 * | 9/2002 | Adjaoute | ............... | 713/201 |
| 2002/0147630 A1 * | 10/2002 | Rose et al. | ............... | 705/10 |
| 2003/0018928 A1 * | 1/2003 | James et al. | ............... | 714/25 |
| 2003/0050915 A1 * | 3/2003 | Allemang et al. | ............... | 707/1 |
| 2003/0135450 A1 * | 7/2003 | Aguais et al. | ............... | 705/38 |
| 2003/0212618 A1 * | 11/2003 | Keyes et al. | ............... | 705/35 |
| 2004/0088211 A1 * | 5/2004 | Kakouros et al. | ............... | 705/10 |
| 2005/0256778 A1 * | 11/2005 | Boyd et al. | ............... | 705/26 |
| 2008/0015889 A1 * | 1/2008 | Fenster | ............... | 705/1 |
| 2009/0132347 A1 * | 5/2009 | Anderson et al. | ............... | 705/10 |

(Continued)

OTHER PUBLICATIONS

Binkley, James K.; Connor, John M., "Grocery Marker Pricing and the New Competitive Environment." Journal of Retailing, v74, n2, Summer 1998.*

(Continued)

*Primary Examiner* — Gurkanwaljit Singh
(74) *Attorney, Agent, or Firm* — MaxvalueIP LLC

(57) ABSTRACT

In one embodiment, we describe a method that generates seasonality rules for anomaly detection for a hierarchical/tree based data structure. A new algorithm for processing nodes in hierarchy, as well as business rules for nodes, is described. Variations and examples are given to describe different scopes and embodiments of the invention. Exclusion criteria and children nodes are used as some examples for the implementations, with flow charts to describe the methods of application, as examples.

18 Claims, 3 Drawing Sheets

U.S. PATENT DOCUMENTS

2010/0030544 A1* 2/2010 Gopalan et al. ............... 703/13
2010/0141443 A1* 6/2010 Romero et al. ............... 340/551
2010/0185499 A1* 7/2010 Dwarakanath et al. ......... 705/10

OTHER PUBLICATIONS

Diebold, Francis X., "The Past, Present, and Future of Macroeconomic Forecasting" Economic Perspectives (IJEP), vol. 12, No. 2, pp. 175-192. Spring 1998.*

Koloszyc, Ginger, "Merchants Try Complex Mathmatical Tools to Improve Inventory Decisions", Stores Magazine, Nov. 1999 [retrieved May 29, 2003], pp. 1-3.*

Eamonn J. Keogh & Michael J. Pazzani. "An Enhanced Representation of Time-Series which Allows Fast and Accurate Classification, Clustering and Relevance Feedback". Fourth Conference on Knowledge Discovery in Databases and Data Mining (1998).*

* cited by examiner

SEASONALITY-BASED RULES FOR DATA ANOMALY DETECTION

BACKGROUND OF THE INVENTION

It is well understood within trade industry that products manufactured/shipped out-of-season can have a higher risk of being substandard and/or deteriorating. As a well-known example, apples arriving from Australia in the month of November may be suspect, due to the seasonality of apple harvest in Australia. Similarly, mangoes arriving from California in the month of February may be suspect, due to the seasonality of mango harvest in California. Most of the vegetables, food crops, and fruits show seasonality trends, which can be analyzed for anomaly detection. Industrial products also show seasonality trends, although to a lesser extent.

There are notable and understandable exceptions to seasonality rules. For example, some companies in the US have excellent greenhouse operations, and as part of their business model, they ship some tomatoes in winter, to cater to the winter demand of tomatoes.

References for related art include:
1. "Algorithms for Mining Distance-Based Outliers in Large Datasets", Edwin M. Knox and Raymond T. Ng, Department of Computer Science, University of British Columbia, Vancouver, BC V6T 124 Canada.
2. "Applications of data mining in computer security", by Daniel Barbará, Sushil Jajodia, Kluwer Academic Publishers, 2002.
3. "Seasonal outliers in time series", Regina Kaiser and Agustin Maravall, Banco de España Working Papers, 1999.
4. "Distance-based outliers: algorithms and applications", Edwin M. Knorr, Raymond T. Ng and Vladimir Tucakov, The VLDB Journal, Springer Berlin/Heidelberg, Volume 8, Numbers 3-4/February, 2000.
5. Distance Based Outlier for Data Streams Using Grid Structure, Manzoor Elahi, Lv Xinjie, M. Wasif Nisar and Hongan Wang, Information Technology Journal, 2009, Volume: 8, Issue: 2, Page No.: 128-137.
6. Multiple hierarchical classification of free-text clinical guidelines, Robert Moskovitch, Shiva Cohen-Kashi, Uzi Dror, Iftah Levy, Amit Maimon and Yuval Shahar, Medical Informatics Research Center, Department of Information Systems Engineering, Ben Gurion University, P.O. Box 653, Beer Sheva 84105, Israel.
7. "Greenhouse Tomatoes Change the Dynamics of the North American Fresh Tomato Industry", at http://postharvest.ucdavis.edu/datastorefiles/234-447.pdf.
8. "Methods for estimating the seasonality of groups of similar items", http://www.patentstorm.us/patents/6834266.html.
9. "Decision support system for the management of an agile supply chain", http://www.patentstorm.us/patents/6151582.html.
10. "System and method for detecting traffic anomalies", http://www.patentstorm.us/patents/6177885/description.html.
11. "Anomaly detection system and a method of teaching it", http://www.freepatentsonline.com/7613668.html.

However, the invention and embodiments described here, below, have not been addressed or presented, in any prior art.

SUMMARY OF THE INVENTION

In one embodiment, we describe a method that generates seasonality rules for anomaly detection for a hierarchical/tree based data structure. A new algorithm for processing nodes in hierarchy, as well as business rules for nodes, is described. Variations and examples are given to describe different scopes and embodiments of the invention.

DETAILED DESCRIPTION OF THE PREFERRED EMBODIMENTS

Figure 1:
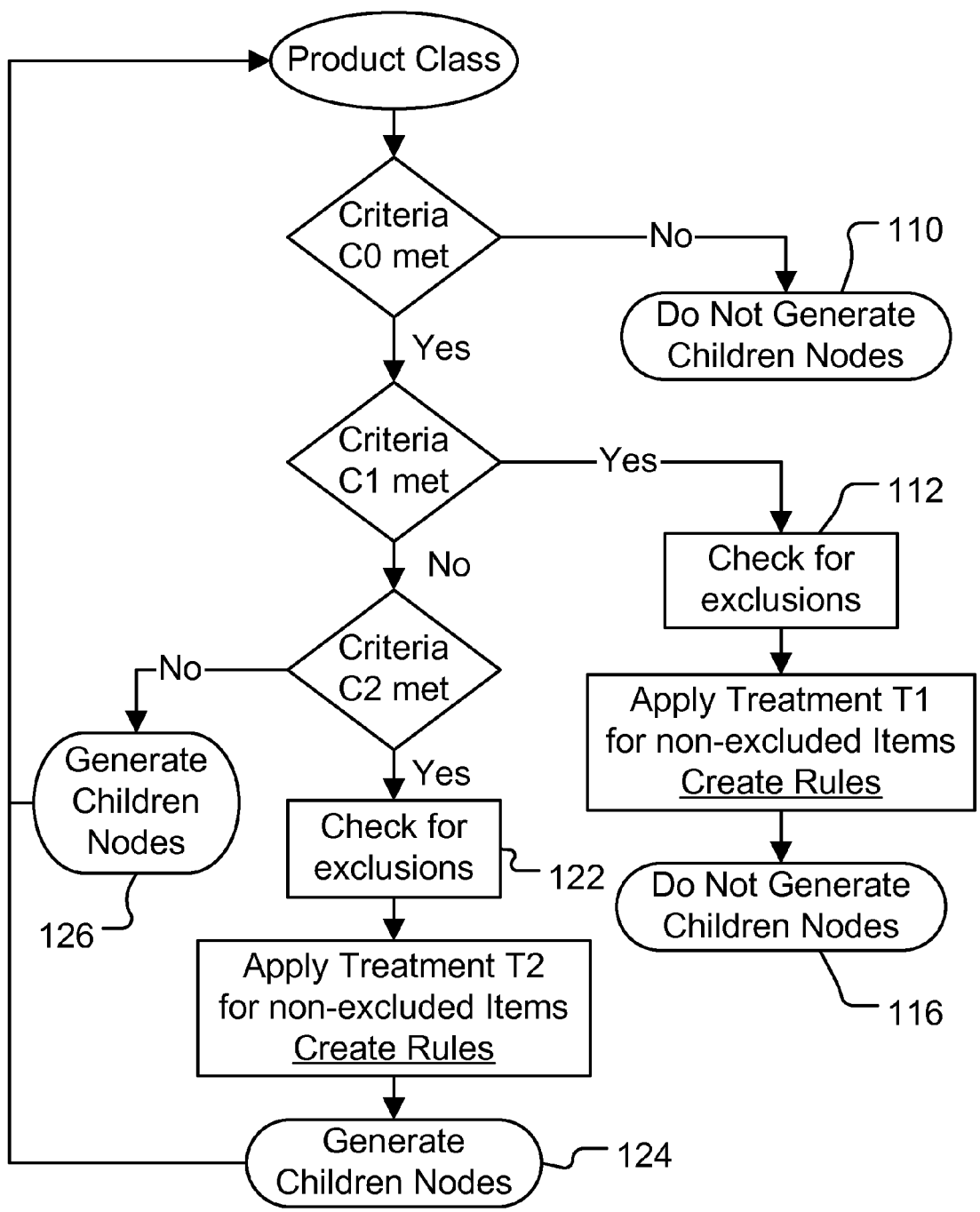
FIG. 1 is The Single Node Seasonality algorithm, for one embodiment, as an example.

Here, in one embodiment, we show how to formulate the problem:

We are given source data consisting of product, associated trade parties and date of activity. The date of activity can be the date of growth/manufacturing or the date of shipping. An example of data can be found here, in Table 1:

TABLE 1

Data sample of products, associated parties, and frequency:

| Product | Associated Trade Party 1 | Associated Trade Party 2 | Quantity | Activity date |
|---|---|---|---|---|
| Cucumber | ABC Grower | Mexico | 100 kg | Jun. 22, 2009 |
| Broccoli | XYZ Grower | Honduras | 40 MTon | Jul. 3, 2009 |
| Apples, Gala | BCD Grower | Nicaragua | 50 sacks | Mar. 15, 2009 |
| Apples | Happy Farmer | Mexico | 2 containers | Mar. 24, 2009 |
| Apples, Granny Smith | BCD Grower | Nicaragua | 60 sacks | Apr. 20, 2009 |

Assume we have a dataset of objects, each having n attributes that belong to their corresponding classes. Hierarchical or not, the dataset can be represented as a tree in the following way: The root node that has no incoming edges represents the entire dataset. Following the root node are level-one nodes, which are generated based on class1 attributes. The n-th generation (or level-n) nodes are leaf nodes with no outgoing edges, and they represent a particular object from a dataset, not a group of objects. Each node has the following statistics or parameters: average frequencies by seasonal term ($S_1$ to $S_k$), and Max, Min, and Median of $S_1$ through $S_k$.

Proposed System and Methodology:
Notations:
Product p
$q_p s_i$: Quantity of a product for a given seasonal term $S_i$
$S_P = \text{Sum}(q_p s_1 \text{ to } q_p s_k)$
$X_P = \text{Max}(q_p s_1 \text{ to } q_p s_k)$
$N_P = \text{Min}(q_p s_1 \text{ to } q_p s_k)$
$D_P = \text{Median}(q_p s_1 \text{ to } q_p s_k)$
Business Rules:
Criteria C0 (Statistically Significant Data): If $S_P >$ Threshold T.

This is the criteria for the node (and subsequently children nodes) not to be eliminated from processing. (Specifically, if Sp>Threshold T, only then we consider that node (and possibly its child nodes). If Sp<=T, then we drop the node and its child nodes altogether.)

Criteria C1 (Strong Seasonality): If $X_P/N_P > G_1$ (e.g. $G_1=100$)

Treatment T1: For each season $S_i$, give a risk increment of $f(S_i, D_P)$, wherein $f(\ldots)$ is a function.

This is the criteria for the children of the node to be eliminated from processing.

Criteria C2 (Weak Seasonality): If $X_P/N_P > G_2$ (e.g. $G_2=4$). This is the criteria when the node and the child nodes are still eligible for further processing.

Obviously, $G_1$ must be greater than $G_2$.

Treatment T2: For each season $S_i$, give a risk increment of $g(S_i, D_P)$, wherein $g(\ldots)$ is a function. The treatment T2 is (in general) different from that of T1, but they can be the same in some situations. In general, the weak seasonality implies that the risk increment of $g(S_i, D_P)$ is not the same order of magnitude as that of $f(S_i, D_P)$.

The Seasonality Algorithm:

We start the process from the parent node (root node, as a starting point) and continue with all the nodes on the same level until all the eligible nodes have been considered. Then, we continue with their child nodes, until we reach all leaf nodes. All children nodes go to the same process called Single Node Seasonality Algorithm. The process for each node is described in FIG. 1, The Single Node Seasonality Algorithm.

Often times in practice, it will not be necessary to aggregate all the products in the same hierarchy. Sometimes, it is more reasonable to find the highest common ancestor, for example, in case of fruits and vegetables, it will be food. To do that, we will track all the products up in the hierarchy so we can find the node in the tree which is the lowest in the hierarchy, but contains all the products of interest (e.g. food). We will consider that node to be the parent node.

Checking for Exclusions:

Check for exclusion process checks to see if the corresponding criterion for a given node is not met by trade parties. If it is not met, then we do not have to apply the corresponding treatment for that subsection.

Criteria C3 (The Exclusion Criteria): The exclusion is said to be held, if the trade party has history with this product, and this seasonal cycle's quantities for this trade party are similar to previous seasonal cycle's quantities for this trade party. Similarity to previous seasonal cycle, in terms of quantities, is defined as deviating/exceeding from previous cycle's quantities by no more than a factor of 2 (or a factor $R_f$, a real number, in general). (The Exclusion Criteria for trade parties is described in FIG. 2.)

Comparison to the prior parameters can also be done using percentages and differences, in relative or absolute values, and also using the neural network method, to find the differences, to train to compare with thresholds, for history on record, in memory units, to find the samples that are beyond the threshold, which should be excluded, deleted, or ignored.

Generating Children Nodes:

Navigating a multiple classification hierarchy can be done by using each level's Information Value. For each candidate child node, we calculate the following statistics:

For each attribute k of the class i, calculate $IV_{ik} = (Sp_{ik} * Xp_{ik}/Np_{ik})/\log(n_i)$, where $Sp_{ik}$ is the sum of quantities for an attribute k of the class i, $n_i$ is the number of attributes of the class i, $Xp_{ik}$ and $Np_{ik}$ are Min and Max of quantities for an attribute k of the class i. Denote $IV_i$ (Information Value) as the sum of all $IV_{ik}$ of existing attributes.

The $Xp_{ik}/Np_{ik}$ (the max over min ratio) is a determinant of the attributes for seasonality, and hence, it goes into the formula for IV (the bigger the ratio, the higher its contribution to the IV value). $Sp_{ik}$ (sum of quantities for an attribute k) serves as a weight factor of the attribute on IV calculation. Thus, if an attribute has small number of quantities, then the weight of max/min ratio is small, as well. The $(Sp_{ik} * Xp_{ik}/Np_{ik})$ value will contribute to IV greatly, if we see both high seasonality and high number of elements. And, finally, we divide the weighted ratio to $\log(n_i)$ to reduce the IV value for the cases when the number of attributes in a class is too many. This reduces the complexity of the hierarchy.

Of course, the weight can be defined differently, to show the magnitudes of max or min, in an alternative, and a normal real number, rather than log-scale, can be used, to express the values and concepts above, in a different scale.

Figure 3:
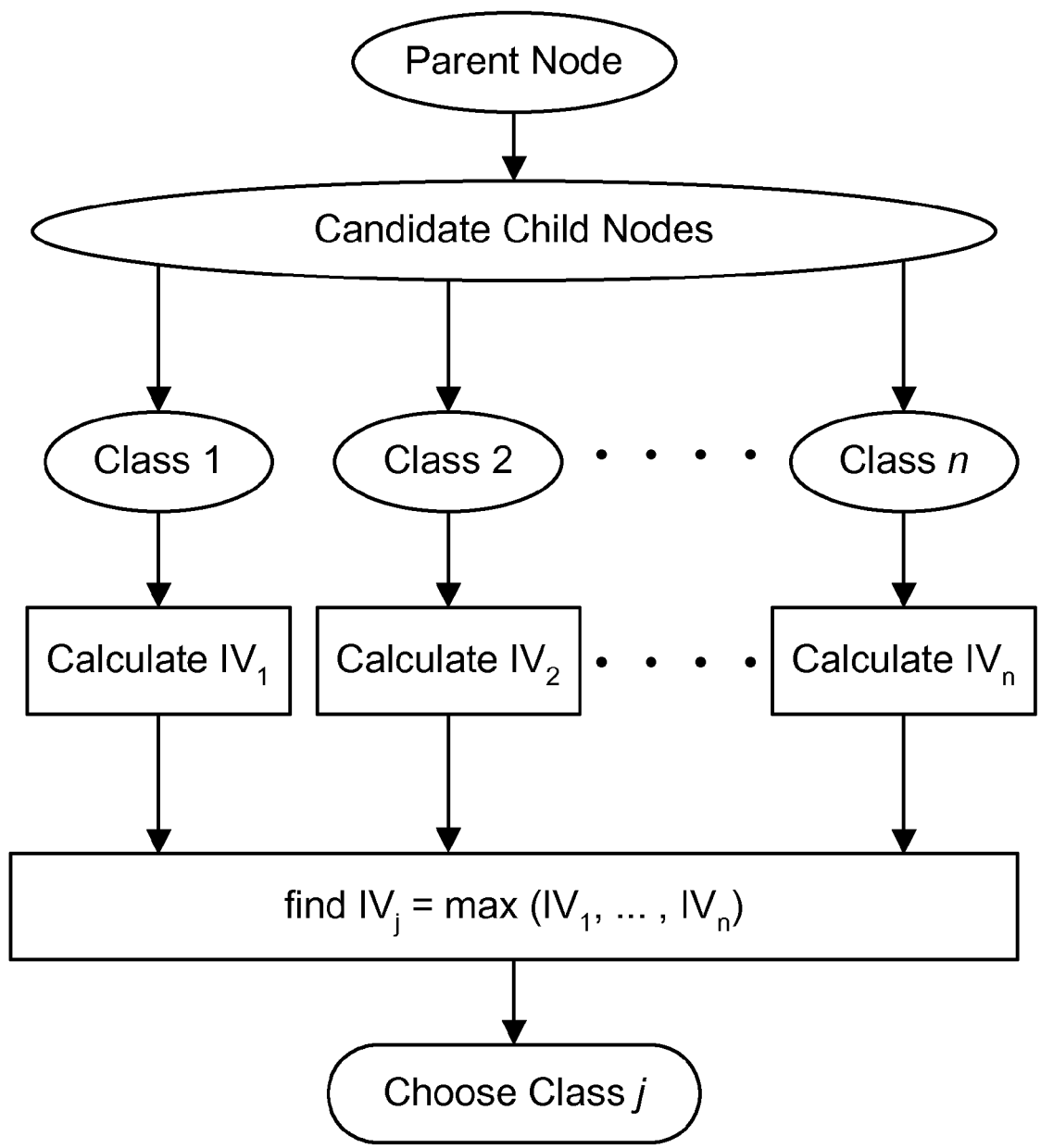
FIG. 3 is A Method for Generating Child nodes, in a multiple classification hierarchy, for one embodiment, as an example.

The class level that gives the highest IV should be chosen as a child node, as shown in FIG. 3, for generating child nodes, in a multiple classification hierarchy.

The season is defined as a period of time or multiple periods of time/windows T1, in which some parameter P1 has a value of M11, and in the other periods, T2, T3, etc, P1 has the value of M12, M13, etc. Similarly, for a parameter P2, we will have (for periods T1, T2, T3, ...) values of M21, M22, M23, etc, respectively. This constitutes a matrix of H by Q, in which we have H different kinds of parameters (or P), and (maximum possible number for) Q different kinds of windows or time or periods (or T). This gives the relationship between all P and T, with resulting M (values) in the matrix form, for the corresponding columns and rows, represented by Mij, with i and j representing row and column numbers, respectively, in the matrix, as the index for element M in the matrix.

Other parameters that can be used, in other embodiments, for measuring or quantizing degree of abnormality, being out-of-season, or anomaly, is based on difference between maximum and minimum for a parameter, the range of 25 percent and 75 percent percentile values for a parameter, or one or 2 standard deviations from mean or average for a parameter. Then, assuming a normal distribution or a similar distribution, the further one gets away from the mean or average, the more abnormal it gets, using a metrics or parameter for quantization or comparison, with a real number normalized between 0 to 100, or between 0 and 1 range, as an example for showing the degree of abnormality or being different from norm or average, as one way to quantify the degree or level of being different, or difference to average or mean. The values or distances are compared or subtracted from each other, and can be divided to the base or original value, to normalize them, for comparisons, or scaling, as an example, to get ratios or percentages.

One can, in one example, subtract or delete the "understandable exceptions", as mentioned above, from the "total" list of exceptions, to get the "net" list of exceptions, for further processing, in our system here.

Figure 2:
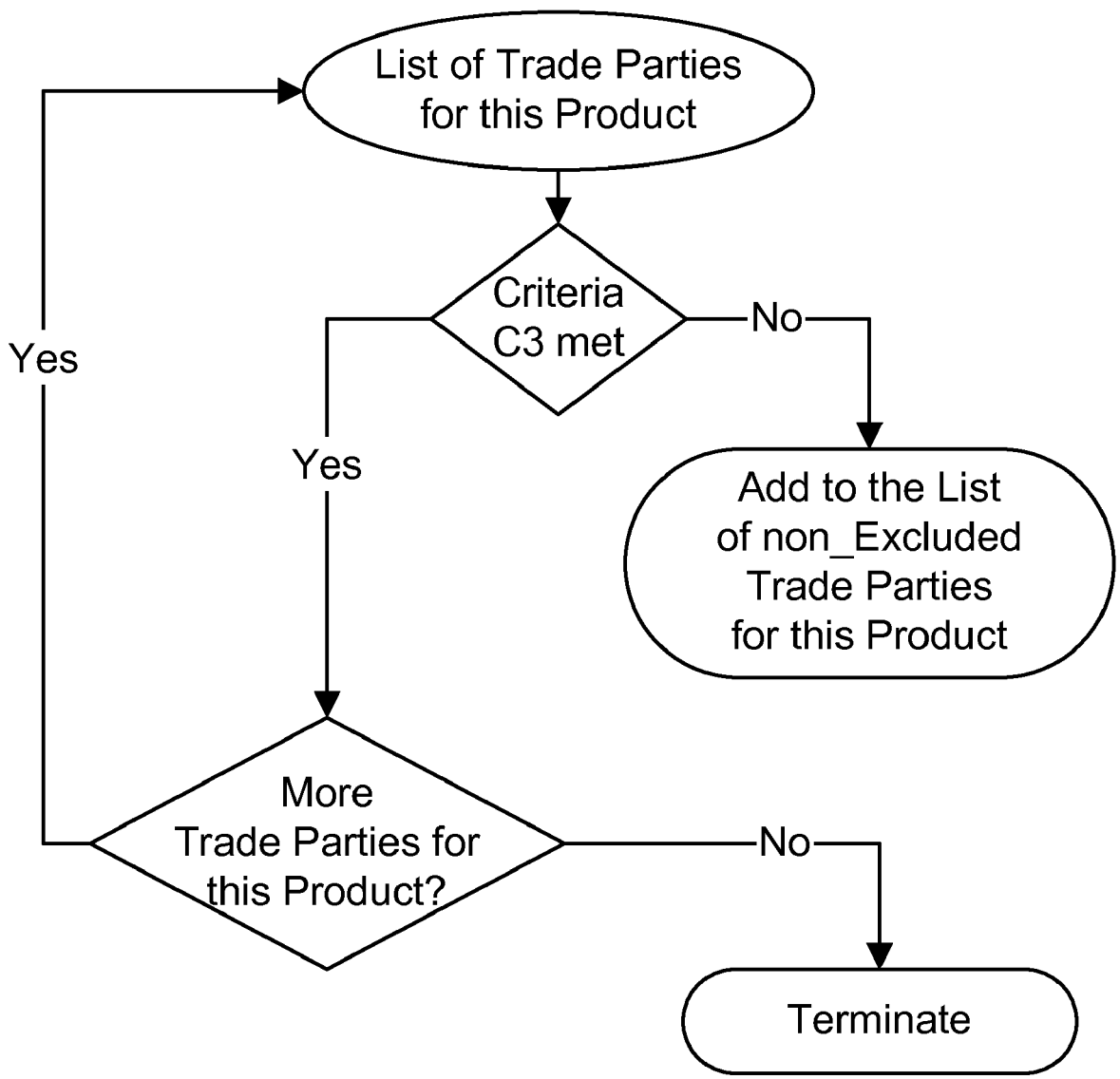
FIG. 2 is The Exclusion Criteria for trade parties, for one embodiment, as an example.

Our system has a central processing unit, in one example, along with multiple storage units, with some user input interface/unit, and communication units between processing module and other modules, e.g. comparison module, exception module, and security module, e.g. doing various tasks shown in FIGS. 1-3, above.

One example: The criteria are stored in first storage unit(s), and parameters are input by a user or from a second storage unit or database/list. The comparisons are done by a system, processor, computer, or microprocessor. The exclusion results and generation of children nodes are done by application or secondary processor unit. The hierarchy and nodes are stored in a memory unit or third storage, as an example. The modules are connected through buffers or other memory units, with another processor directing all the data transfer and actions. One can combine processors and memory units, in one or fewer units, if desired, in another embodiment.

Any variations of the above teaching are also intended to be covered by this patent application.

The invention claimed is:

1. A method for anomaly detection, using seasonality based rules, said method comprising:
   a first central processing unit receiving a set of parameters for a manufactured or shipped product;
   obtaining a set of criteria from a first storage unit;
   with respect to a product class, said first central processing unit examining a first criteria to see if said first criteria is met;
   if said first criteria is met, then said first central processing unit examining a second criteria to see if said second criteria is met; and
   if said first criteria is not met, then said first central processing unit disabling children node generation wherein children node generation refers to generating an information value level for a classification hierarchy; and
   if said second criteria is met, then said first central processing unit checking for exclusions, applying a first treatment for non-excluded items from a second storage unit, and creating rules and disabling children node generation;
   otherwise, if said second criteria is not met, then said first central processing unit examining a third criteria to see if said third criteria is met; and
   if said third criteria is not met, then said first central processing unit generating children nodes for the hierarchy, and returning said generated children nodes to said product class stored in a third storage unit; and
   if said third criteria is met, then said first central processing unit checking for exclusions, applying a second treatment for non-excluded items from said second storage unit, and creating rules and generating children nodes, and returning said generated children nodes to said product class stored in said third storage unit.

2. The method for anomaly detection, using seasonality based rules, as recited in claim 1, further comprising:
   examining for existence of strong seasonality or weak seasonality.

3. The method for anomaly detection, using seasonality based rules, as recited in claim 1, further comprising:
   receiving a list of trade parties.

4. The method for anomaly detection, using seasonality based rules, as recited in claim 1, further comprising:
   adding to a list of non-excluded trade parties.

5. The method for anomaly detection, using seasonality based rules, as recited in claim 1, further comprising:
   examining if there are more trade parties.

6. The method for anomaly detection, using seasonality based rules, as recited in claim 1, further comprising:
   terminating a process.

7. The method for anomaly detection, using seasonality based rules, as recited in claim 1, further comprising:
   generating a tree or hierarchical structure.

8. The method for anomaly detection, using seasonality based rules, as recited in claim 1, further comprising:
   generating a parent node.

9. The method for anomaly detection, using seasonality based rules, as recited in claim 1, further comprising:
   assigning or choosing a class.

10. The method for anomaly detection, using seasonality based rules, as recited in claim 1, further comprising:
    considering N different classes, wherein N is an integer bigger than 1.

11. The method for anomaly detection, using seasonality based rules, as recited in claim 1, further comprising:
    calculating a first value for each attribute of a class.

12. The method for anomaly detection, using seasonality based rules, as recited in claim 1, further comprising:
    determining a maximum value of a set of second values.

13. The method for anomaly detection, using seasonality based rules, as recited in claim 1, further comprising:
    determining values beyond one or more thresholds.

14. The method for anomaly detection, using seasonality based rules, as recited in claim 1, further comprising:
    determining anomalies.

15. The method for anomaly detection, using seasonality based rules, as recited in claim 1, further comprising:
    determining odd shipments at a custom office.

16. The method for anomaly detection, using seasonality based rules, as recited in claim 1, further comprising:
    reexamining odd shipments at a custom office.

17. The method for anomaly detection, using seasonality based rules, as recited in claim 1, further comprising:
    generating seasonality rules.

18. The method for anomaly detection, using seasonality based rules, as recited in claim 1, further comprising:
    aggregating reports for two or more trading parties.

* * * * *